Patented June 14, 1927.

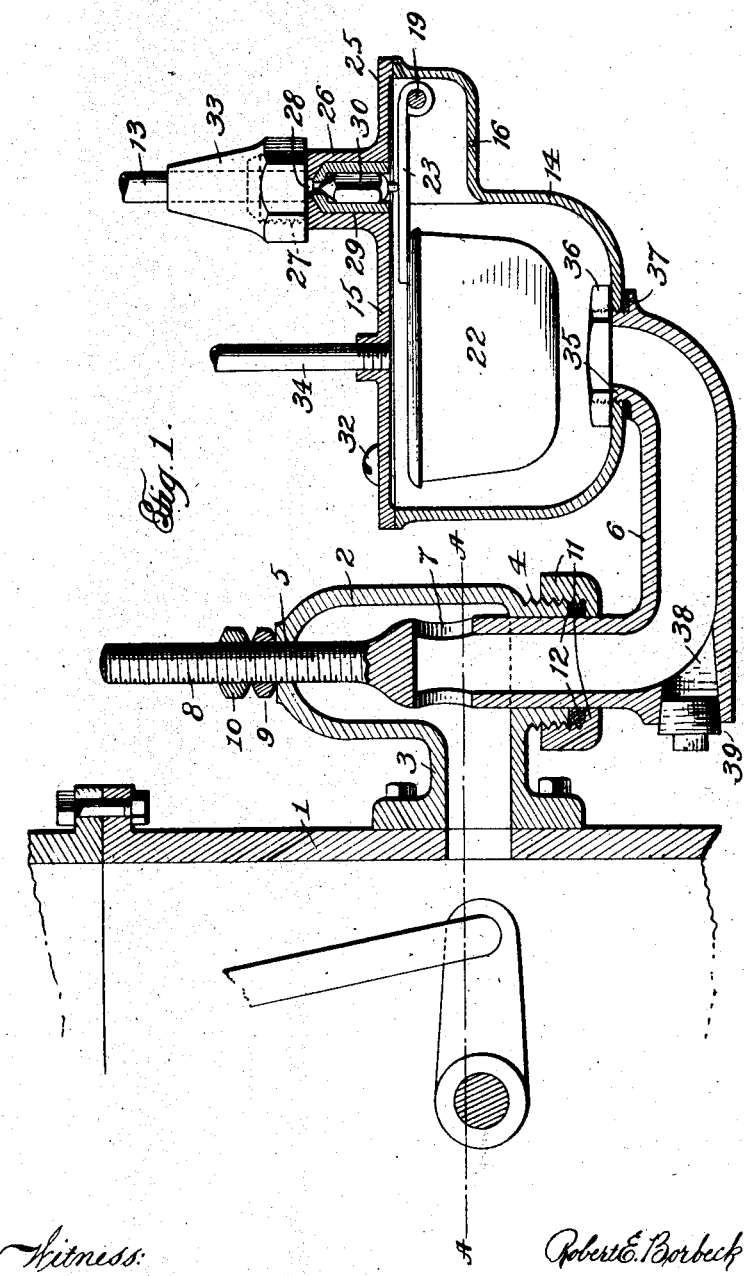

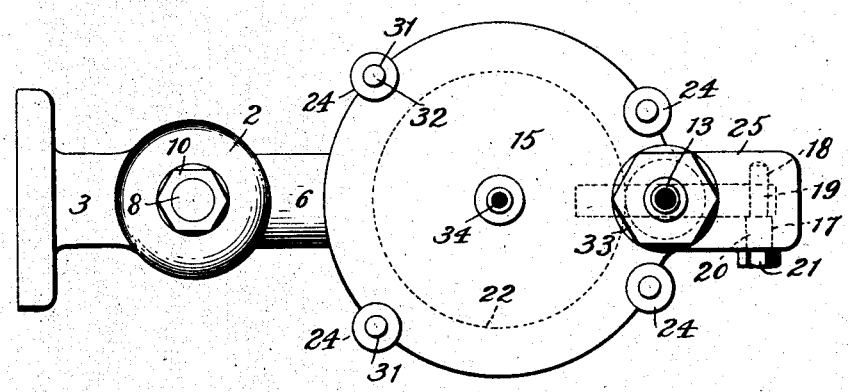
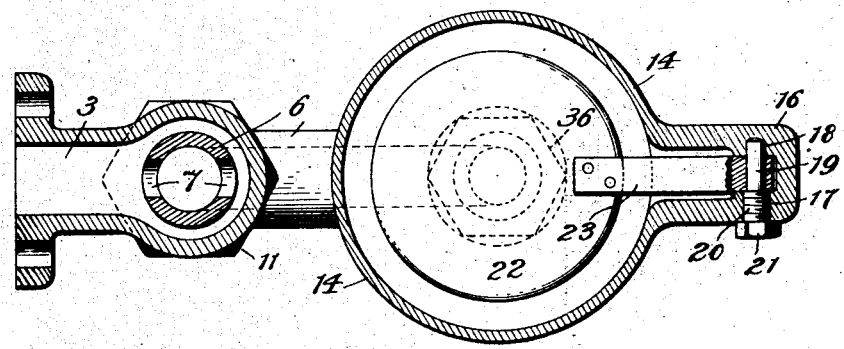

1,632,215

UNITED STATES PATENT OFFICE.

ROBERT E. BORBECK AND GEORGE C. TRUMAN, OF LOS ANGELES, CALIFORNIA.

OIL-LEVEL REGULATOR.

Application filed December 24, 1921. Serial No. 524,805.

This invention relates to certain new and useful improvements in an oil level regulator, which is especially adapted for use in connection with an oiling system of an internal combustion engine wherein a constant supply of oil is held in reserve and is automatically fed to the point of consumption. This device, as illustrated in the attached drawings, is shown in connection with what is known in the art as a "splash" system, but it will of course be understood that the same might be used in connection with any other system wherein efficient oiling is required and where there is a natural consumption of oil which must be constantly supplied or renewed to insure proper lubrication of the moving parts to which such oil is applied.

The primary object of the invention resides in the novel manner of adjusting the level of the oil within the engine casing, or any other structure housing a movable element of the engine. The level of the oil in the present case can easily be adjusted without tampering with the internal mechanism of the float gauge, which gauge governs the feed of the oil through the system. In devices that are in common use today, the usual and in fact the only manner of changing the oil level in the engine casing is to adjust the float member to cause its action to be delayed or advanced according to the desired requirements. These float members and their associated valve parts are delicate pieces of mechanism, which require a person to be of a somewhat skilled mechanical mind to change the operations thereof. With the present attachment there is no need of tampering with the float mechanism so that the operator, whether skilled or not, can easily change the level of the oil in the engine casing according to the consumption of the oil at the lubricating point.

Another object of the present invention resides in the formation of a series of traps between the engine casing and the valvular part of the float member, which traps effectively prevent the return of dirt, metallic or any other solid bodies to the float chamber. In systems that are in vogue today it has been found that the return of these various solid bodies to the float chamber, when the engine is brought to a standstill, usually lodge between the valve plug and its seat and therefore reduce the efficiency or at least the perfect operation of the structure. By preventing the return of these particles to the float chamber, as in the present case by the traps, this disadvantage as just described is overcome.

With the foregoing and other objects in view it will appear as the description proceeds, the invention resides in the combination and arrangement of parts and in the detail construction hereinafter described and claimed, it being understood that the changes in the precise embodiment of the invention herein disclosed can be made within the scope of what is claimed without departing from the spirit of the invention.

In the drawings Fig. 1 is a side view mostly in section, to more clearly illustrate the detail construction;
Fig. 2 is a top plan view of the attachment; and Fig. 3 is a view similar to Fig. 2 but with the cover of the reservoir removed and the gauge chamber shown in section.

Referring more in detail to the drawings 1 designates an engine housing which in the present instance signifies the crank case of an internal combustion engine. This casing as usual houses the crank shaft and the connected pitmen of the pistons. Within this crank case a constant level of oil is maintained at a point indicated by the dotted line A—A. The rotation of the crank shaft with the connected pitmen results in splashing operation of the oil which effectively covers the movable elements within the housing with a film of oil. To supply the crank cases with the necessary amount of oil the following provision is made.

To the side of the crank case, and in open communication therewith is a chamber having an elongated body portion designated 2 and an outlet portion 3. This chamber is secured to the engine casing in any suitable manner as for instance by welding or by bolts. The lower end of this chamber is provided with an externally threaded extension as indicated at 4, while at its upper end the chamber is apertured as at 5. Snugly fitting within the externally threaded extension 4 is a fluid conduit illustrated at 6. This conduit is provided with an outlet aperture 7 and terminally ends in a threaded extension 8, which extension passes through the aperture 5 in the upper end of the chamber. Threadedly engaged on the extension 8 is a nut illustrated at 9, which nut is locked in position by superimposed nutted member illustrated at 10. Engageable with the threaded extension 4 of the chamber is a stuffing gland designated 11 between which gland and the terminal end of the threaded extension 4 is interposed a suitable packing designated 12. This stuffing gland together with the packing constitute a stuffing box to prevent the escape of oil between the side walls of the conduit 6 and the interior wall of the extension 4.

The oil supply reservoir, as in all systems of the character under consideration is positioned at any point on the vehicle or structure above the level point of the engine casing 1 and from this oil reservoir the lubricant is conducted by a pipe illustrated at 13. This pipe 13 is usually of a flexible character so as to permit a slight bending thereof without impairing the passage therethrough. This pipe 13 leads from the reservoir to a float chamber which will now be described.

The float chamber is constructed of a body portion illustrated at 14 and a cover therefor designated at 15. The body portion of the float chamber is provided with a laterally extending recessed portion designated 16. One side wall of this laterally extending portion 16 is threadedly tapped as at 17 while the opposite side wall is provided with a socketed recess 18. A bearing pin having a smooth portion 19 and a threaded enlargement 20 is adapted to be positioned within the corresponding portions 18 and 17 just mentioned. The bearing pin has a nutted head as at 21 to permit the manipulations thereof. When the bearing pin is in position the smoothed portion thereof spans the space between the side walls of the laterally extended portion of the float body 14. Within the float body 14 there is also positioned a float 22, which float may be of any usual construction now on the market. Pivotally supported upon the smoothed portion 19 of the bearing pin is a strap member designated 23, which strap member is terminally secured at its free end to the float 22. The upper edge of the float body 14 is provided with a series of threaded bosses designated 24—24 for a purpose hereinafter described.

The cover for the float body is correspondingly shaped to the outlines of the upper edge of the float body 14 and is therefore provided with an extension designated 25 which covers the recessed portion 16 in the float body. Extending upwardly from the cover 15 is a bossed extension illustrated at 26 which terminates in an externally threaded portion 27. The bossed extension 26 as well as the extension 27 is provided with a passageway 28 which passageway is enlarged at its point of passage through the bossed extension 26 as shown at 29. This point of enlargement of the passageway 28 provides a valve seat with which a valve plug illustrated at 30 is adapted to actuate. The valve plug in the present instance is of a rectangular formation on its side portions, while at its head it is conical to effectually cooperate with the valve seat. The lower face of this valve plug 30 is adapted to rest against the upper surface of the strap member 23 within the float body 14, when the cover 15 is secured in its operative position. In order to hold the cover member 15 firmly in its operative position the said cover member 15 is provided with a series of peripherally arranged holes or passages designated 31, through which holes suitable binding elements designated 32 are adapted to pass and threadedly engaged within the bosses 24 in the upper end of the float body 14.

The pipe 13 is suitably connected to the extension 27 through the employment of a coupling generally illustrated at 33 which threadedly engages over the externally threaded extension 27. A suitable vent opening 34 is also provided in the cover 15, which vent opening freely permits the backing of the oil up into the float chamber when the engine or the operative part thereof is brought to a standstill.

As shown in the drawings the conduit 6 is of a general U-shaped form and is provided with an externally threaded flange 35 which is adapted to fit within a bottom opening in the float body 14 and firmly anchored therein by a nutted member 36, the side portions of which are adapted to rest against the interior surface of the body 14. To prevent the escape of oil at this point of connection any suitable type of gasket as illustrated generally at 37 may be employed. The conduit 6 at its lowest point is provided with a clean-out aperture designated 38, which aperture is normally sealed or closed by the threaded plug 39.

For the purpose of further understanding the invention, let us assume that the attachment is in applied position to the crank case of an internal combustion engine and that the amount of oil within the crank case has been found to be insufficient to properly enable the movable parts of the engine to effectively splash the oil and thereby lubricate the enclosed bearings. If such is the case the oil level within the crank case is raised simply by turning on the nutted member 9 which raises the conduit 6 so that its outlet end 7 is further drawn into the chamber secured to the side of the engine casing 1. It will of course be understood that the float member 22 has been previously regulated to supply the oil through the conduit 6 so that the flow is maintained slightly above the outlet end 7 of said conduit 6. This vertical adjustment of the conduit 6 carries with it the float chamber and its valvular parts so that the level of the oil in the crank case is raised according to this vertical adjustment. Whenever the engine is brought to a standstill the oil films which are upon the movable parts of the engine structure, will drain back into the crank case and thereby effectively raise the level thereof. This surplus amount of oil will be permitted to accumulate above the outlet end of the conduit 6 and should any heavy particles be carried by this oil they will be effectively trapped by reason of the fact that the outlet end of the conduit 6 is above the lower wall of the attached chamber. If by chance any of these particles should enter the conduit 6 they will be retained within the lower run thereof and thereby prevented from entering the float chamber and interfering with the operation of the valvular parts thereof.

What we desire to secure by United States Letters Patent is:

1. In a device of the class described, the combination of a casing adapted to house an operative part of an engine, a chamber in open communication with said casing, an oil supply conduit slidably fitted into said chamber from the underside thereof and having an outlet disposed within the chamber, and means for vertically adjusting said conduit within the chamber to determine the level of the lubricant within the casing.

2. In a device of the class described, the combination of a casing adapted to house an operative part of an engine, a chamber in open communication with said casing, an oil supply conduit slidably fitted and extending upwardly into said chamber and provided with an outlet aperture located within the chamber, and means associated with the supply conduit and extending to the exterior of the chamber for vertically adjusting the conduit to determine the level of the lubricant within the casing.

3. In a device of the class described, the combination of a casing adapted to house an operative part of an engine, a chamber in open communication with said casing, an oil supply conduit leading into the chamber and provided with an outlet opening above the bottom wall of the chamber, said conduit having an extension thereon, said extension projecting through the top wall of the chamber, and means coactive with said extension for vertically adjusting the conduit to determine the level of the lubricant within the casing.

4. In a device of the class described, the combination of a casing adapted to house an operative part of an engine, a chamber in open communication with said casing, an oil supply conduit leading into the chamber and provided with an outlet opening above the bottom wall of the chamber, said conduit having a threaded extension thereon, said extension projecting through the top wall of the chamber, and means on the threaded extension for vertically adjusting the conduit to determine the level of the lubricant within the casing.

5. In a device of the class described, the combination of a casing adapted to house an operative part of an engine, a chamber in open communication with said casing, an oil supply conduit leading into the chamber and provided with an outlet opening above the bottom wall of the chamber, said conduit having a threaded extension thereon, said extension projecting through the top wall of the chamber, and a nut on the threaded extension and bearing against the outer wall of the chamber for vertically adjusting the conduit to determine the level of the lubricant within the casing.

6. In a device of the class described, the combination of a casing adapted to house an operative part of an engine, an elongated chamber communicating at its lower end with said casing, a supply conduit leading into said chamber and provided with an outlet aperture above the bottom wall of the chamber, and means for vertically adjusting the outlet end of said conduit within the elongated chamber for determining the level of the lubricant within the casing.

7. In a device of the class described, the combination of a casing adapted to house an operative part of an engine, a chamber in open communication with the casing, a conduit leading into said chamber and having its outlet end above the bottom wall thereof, a float actuated member for controlling the flow of lubricant through said conduit and means for vertically adjusting the conduit and the float member to determine the level of the lubricant within the engine casing.

8. In a device of the class described, the combination of a casing adapted to house an operative part of an engine, a chamber secured to the casing and in open communication therewith, a main supply pipe, a float chamber, a float actuated member in said float chamber for controlling the flow of lubricant from the main supply pipe, a conduit leading from the float chamber and terminating within the first mentioned chamber above the bottom wall of the latter, and means for vertically adjusting the outlet end of the conduit within the first mentioned chamber to determine the level of the lubricant within the engine casing.

9. In a device of the class described, the combination of a casing adapted to house an operative part of an engine, a chamber secured to the side of the casing and in open communication therewith, a conduit terminating at its outlet end within the said chamber above the bottom wall thereof, a float chamber connected to said conduit at the inlet end thereof, float actuated mechanism within the float chamber for governing the flow of lubricant therethrough, and means for vertically adjusting the outlet end of said conduit within the first mentioned chamber to determine the level of the lubricant within the engine casing.

In testimony whereof we hereunto affix our signatures.

ROBERT E. BORBECK.
GEORGE C. TRUMAN.